United States Patent
Alsina et al.

(10) Patent No.: US 11,496,381 B2
(45) Date of Patent: *Nov. 8, 2022

(54) REDUCING STARTUP DELAYS FOR PRESENTING REMOTE MEDIA ITEMS

(71) Applicant: Apple Inc., Cupertino, CA (US)

(72) Inventors: Thomas Alsina, Saratoga, CA (US);
Arvind S. Shenoy, San Jose, CA (US);
Ketankumar B. Patel, Santa Clara, CA (US);
Nicholas J. Paulson, San Francisco, CA (US);
Pierre de Lastic, Belmont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,344

(22) Filed: Apr. 12, 2021

(65) Prior Publication Data
US 2021/0234781 A1    Jul. 29, 2021

Related U.S. Application Data

(63) Continuation of application No. 15/693,105, filed on Aug. 31, 2017, now Pat. No. 10,979,331.

(Continued)

(51) Int. Cl.
*H04L 43/0864* (2022.01)
*H04L 43/0817* (2022.01)
(Continued)

(52) U.S. Cl.
CPC .......... *H04L 43/0864* (2013.01); *G06F 16/40* (2019.01); *H04L 43/0817* (2013.01);
(Continued)

(58) Field of Classification Search
None
See application file for complete search history.

(56) References Cited

U.S. PATENT DOCUMENTS

| | | |
|---|---|---|
| 8,660,846 B2 | 2/2014 | Reichardt et al. |
| 8,997,254 B2 | 3/2015 | Amidei et al. |

(Continued)

FOREIGN PATENT DOCUMENTS

| | | |
|---|---|---|
| CN | 101198022 A | 6/2008 |
| CN | 102480643 A | 5/2012 |

(Continued)

OTHER PUBLICATIONS

International Search Report and Written Opinion for PCT Application No. PCT/US/2018/027810 dated Jun. 28, 2018; 13 pgs.

(Continued)

*Primary Examiner* — Schquita D Goodwin
*Assistant Examiner* — Ishrat Rashid
(74) *Attorney, Agent, or Firm* — Fletcher Yoder, P.C.

(57) ABSTRACT

In some implementations, a computing system can reduce startup delays for presenting remote media items. For example, when a user requests media content from a media service, the computing system can include information about the first media item to be played in the initial startup messages to reduce the number of roundtrips needed between client and server devices to present the first media item. A media item can include an introductory asset. The introductory asset can be a portion of the full media item that can be decrypted with a local key or not encrypted at all so that a media client can receive and start presenting the introductory media asset quickly while the full media item is being processed by the media client. In some implementations, the system can remove leading silence from the media item so that the amount of delay perceived by the user is reduced.

20 Claims, 7 Drawing Sheets

Related U.S. Application Data

(60) Provisional application No. 62/507,040, filed on May 16, 2017.

(51) Int. Cl.
*H04L 65/80* (2022.01)
*G06F 16/40* (2019.01)
*H04L 65/1069* (2022.01)
*H04L 65/65* (2022.01)
*H04L 65/612* (2022.01)
*H04L 67/01* (2022.01)

(52) U.S. Cl.
CPC ........ *H04L 65/1069* (2013.01); *H04L 65/612* (2022.05); *H04L 65/65* (2022.05); *H04L 65/80* (2013.01); *H04L 67/01* (2022.05)

(56) References Cited

U.S. PATENT DOCUMENTS

| | | | |
|---|---|---|---|
| 9,431,021 B1 | 8/2016 | Scalise et al. | |
| 9,734,151 B2 | 8/2017 | Patel et al. | |
| 10,388,274 B1* | 8/2019 | Hoffmeister | G06F 16/24522 |
| 2004/0019497 A1* | 1/2004 | Volk | H04N 21/25875 |
| | | | 705/1.1 |
| 2005/0114141 A1 | 5/2005 | Grody | |
| 2007/0174866 A1 | 7/2007 | Brown et al. | |
| 2009/0076821 A1* | 3/2009 | Brenner | G06F 16/64 |
| | | | 707/999.001 |
| 2011/0202947 A1 | 8/2011 | Gupta et al. | |
| 2012/0331167 A1* | 12/2012 | Hunt | H04N 21/6334 |
| | | | 709/231 |
| 2014/0259084 A1 | 9/2014 | Polumbus et al. | |
| 2015/0106404 A1 | 4/2015 | Boulter et al. | |
| 2015/0142430 A1 | 5/2015 | Kwon | |
| 2015/0245107 A1* | 8/2015 | Klappert | H04N 21/4858 |
| | | | 725/45 |
| 2015/0288732 A1 | 10/2015 | Phillips et al. | |
| 2015/0379118 A1 | 12/2015 | Wickenkamp et al. | |
| 2016/0180840 A1 | 6/2016 | Siddiq et al. | |
| 2016/0313970 A1 | 10/2016 | Malhotra et al. | |
| 2016/0342383 A1* | 11/2016 | Parekh | G06F 3/165 |
| 2017/0243576 A1 | 8/2017 | Millington et al. | |

FOREIGN PATENT DOCUMENTS

| | | |
|---|---|---|
| CN | 103078915 A | 3/2013 |
| CN | 105681874 A | 6/2016 |
| WO | 2005024780 A2 | 3/2005 |
| WO | 2007022533 A2 | 2/2007 |
| WO | 2011088053 A2 | 7/2011 |

OTHER PUBLICATIONS

Chinese Office Action for CN Application No. 201880028712.0 dated Sep. 8, 2022; 6 pgs.
Chinese Search Report for CN Application No. 201880028712.0 dated Sep. 1, 2022; 6 pgs.

\* cited by examiner

REDUCING STARTUP DELAYS FOR PRESENTING REMOTE MEDIA ITEMS

CROSS-REFERENCE TO RELATED APPLICATIONS

This application is a continuation of U.S. patent application Ser. No. 15/693,105, entitled "Reducing Startup Delays for Presenting Remote Media Items," filed Aug. 31, 2017, which claims priority to U.S. Provisional Application No. 62/507,040, entitled "Reducing Startup Delays for Presenting Remote Media Items," filed on May 16, 2017, both of which are incorporated herein by reference in their entireties for all purposes.

TECHNICAL FIELD

The disclosure generally relates to playing media items from a network media service.

BACKGROUND

Networked media services (e.g., media services, internet radio, television services, movie services, etc.) have become commonplace. As computer processing speeds and network speeds have increased, delays with respect to receiving media items over network connections from these various network media services have decreased. However, users may still experience some delays between requesting a media item and receiving a media item when initially establishing a connection with a network media service. Reducing these initial delays can make a user device and/or a network media service feel more responsive to the user and, thereby, provide a better user experience.

SUMMARY

In some implementations, a computing system can reduce startup delays for presenting remote media items. For example, when a user requests media content from a media service, the computing system can include information about the first media item to be played in the initial startup messages to reduce the number of roundtrips needed between client and server devices to present the first media item. A media item can include an introductory asset. The introductory asset can be a portion of the full media item that can be decrypted with a local key or not encrypted at all so that a media client can receive and start presenting the introductory media asset quickly while the full media item is being processed by the media client. In some implementations, the system can remove leading silence from the media item so that the amount of delay perceived by the user is reduced.

Particular implementations provide at least the following advantages. The computing system can deliver the first media asset with fewer roundtrip connections between client and server thereby reducing the amount of time between a user's request for a media item and playback of the media item. The computing system can begin playback of a media item more quickly by initially presenting an introductory media asset and then transitioning to the full media asset after the full media asset has been received and decrypted.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
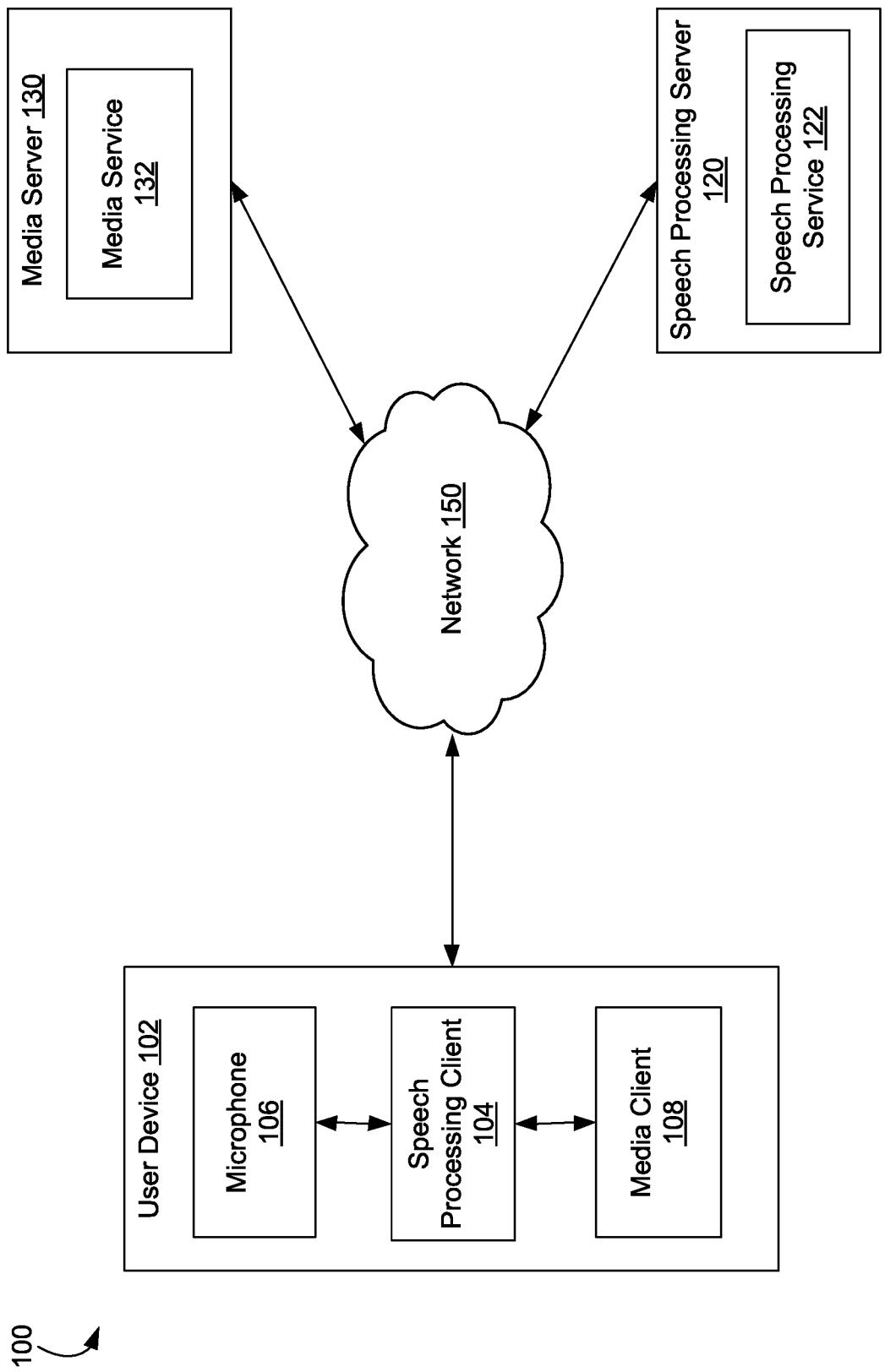
FIG. 1 is a block diagram of an example system for reducing startup delays for presenting remote media items.

FIG. 1 is a block diagram of an example system 100 for reducing startup delays for presenting remote media items. For example, system 100 can be a computing system comprised of several different computing devices, including at least one user device 102, media server 130, and/or speech processing server 120. These computing device can communicate with each other through network 150 (e.g., local area network, wide area network, the Internet, etc.) to cooperatively provide the features and/or functions described herein for reducing startup delays for presenting remote media items.

In some implementations, system 100 can include user device 102. For example, user device 102 can be a mobile device, such as a laptop computer, smartphone, in car audio system, wearable device, and/or smart speaker system. Wearable devices can include smart watches, smart glasses, or any other type of wearable computing device. In some implementations, user device 102 can be a desktop computer or other type of non-portable device.

In some implementations, user device 102 can include speech processing client 104. For example, the user of user device 102 can provide input (e.g., hold down a button, say a particular phrase, etc.) to invoke speech processing client 104. After invoking speech processing client 104, the user can speak a verbal command (e.g., "play some Jazz"). Microphone 106 can detect the spoken verbal command and send audio data corresponding to the user's speech to speech processing client 104. In response to receiving the audio data, speech processing client 104 can send the audio data to speech processing service 122 on speech processing server 120 through network 150 for processing.

In some implementations, system 100 can include speech processing server 120. For example, speech processing server 120 can represent a single server device or a group of server devices. Speech processing server 120 can include speech processing service 122. Speech processing service 122 can receive audio data corresponding to a user spoken command. Speech processing service 122 can process the audio data to determine the command spoken by the user and to determine what action or operation to perform in response to the spoken command, as described in detail herein below. After determining an action or operation to perform, speech processing service 122 can send command response data describing what action or operation to perform to speech processing client 104 and speech processing client 104 can cause user device 102 to perform the action or operation. In some implementations, the action or operation can include causing media client 108 to obtain and/or present media items through a speaker, display and/or other output (e.g. Bluetooth, Wi-Fi, etc.) from user device 102.

In some implementations, user device 102 can include media client 108. For example, media client 108 can communicate with media service 132 on media server 130 to obtain media items (e.g., music tracks, television episodes, movies, radio talk shows, electronic books, etc.). For example, the user of user device 102 may have subscribed to a network (e.g., cloud) media service (e.g., media service 132). The user may access the media service using user device 102 through media client 108. The user may interact with various graphical user interfaces of media client 108 to browse, search for, and/or select music to play on or by user device 102. Media client 108 can obtain the selected music from media service 132 and present the music through a speaker, display and/or other output mechanism of user device 102.

In some implementations, speech processing client 104 can provide a speech interface to media client 108. As described above, the user can invoke speech processing client 104 and speak a command to play some media (e.g., "play some country music, shuffled"). Speech processing client 104 can send the audio data corresponding to the speech to speech processing service 122. Speech processing service 122 can send a command response back to speech processing client 104 indicating an operation or action to be performed in response to the detected speech. Since the spoken command relates to playing some media, speech processing client 104 can invoke or interface with media client 108 to cause media client 108 to perform the media related operation or action in response to the spoken command. For example, the operation and/or action may include obtaining and/or presenting a media item obtained from media service 132.

Figure 2:
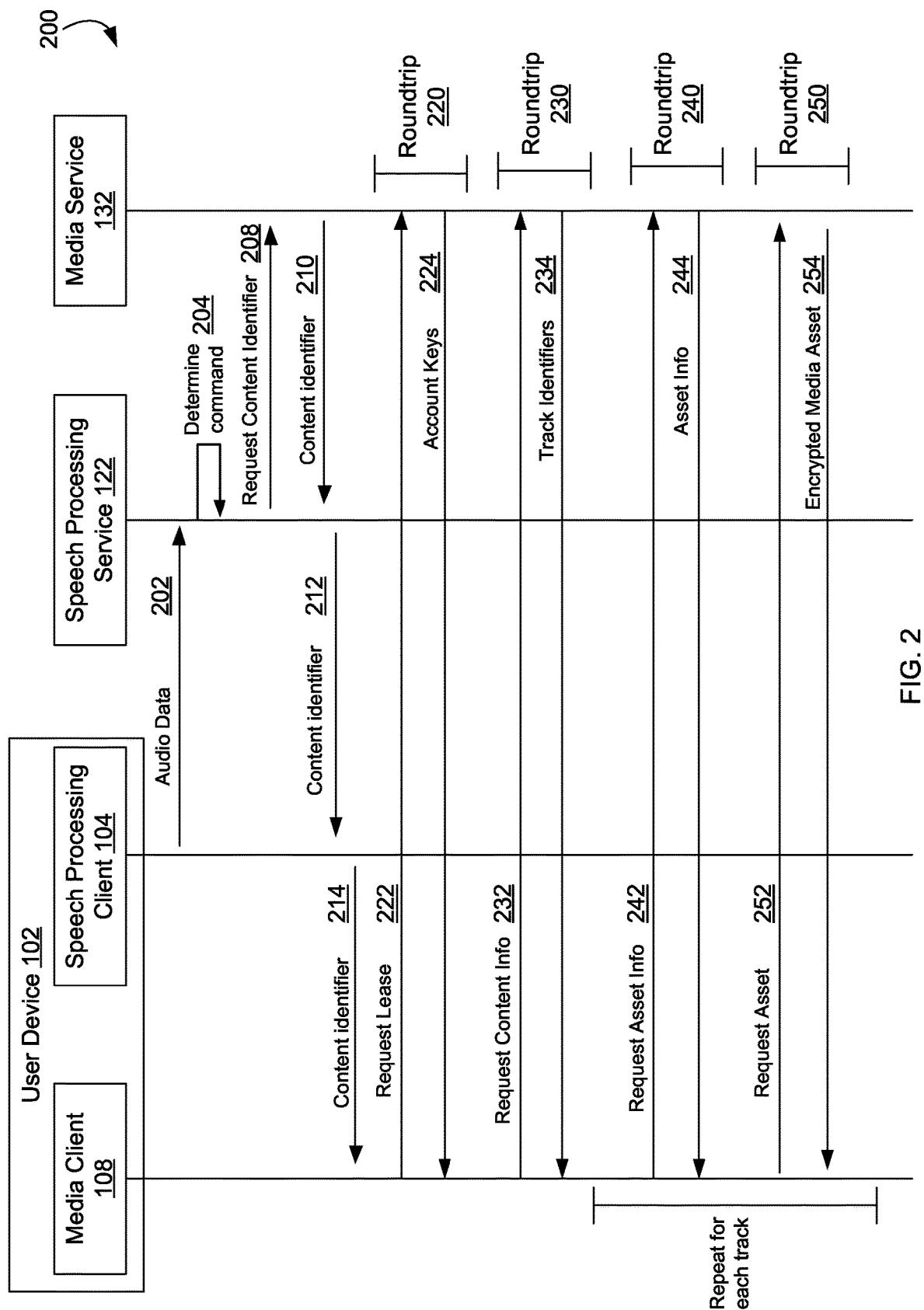
FIG. 2 is a process interaction flow diagram illustrating the operations performed by system when processing a spoken command to obtain media items from a network media service.

FIG. 2 is a process interaction flow diagram 200 illustrating the operations performed by system 100 when processing a spoken command to obtain media items from a network media service. For example, when a user invokes speech processing client 104 on user device 102, speech processing client 104 can receive audio data corresponding to the user's spoken command from microphone 106 of user device 102, as described above.

At operation 202, speech processing client 104 can send the audio data to speech processing service 122. For example, in response to receiving the audio data from microphone 106, speech processing client 104 can send the audio data containing the user's speech to speech processing service 122.

At operation 204, speech processing service 122 can process the audio data to determine the command spoken by the user. For example, in response to receiving the audio data, speech processing service 122 can process the audio data to determine the command spoken by the user. For example, the command can identify an operation to be performed by media client 108 (e.g., play a media item). The command can identify a media item upon which the operation is to be performed (e.g., a name for a media item, genre, playlist, album, movie, etc.). The command can indicate an option for performing the operation (e.g., repeated playback, shuffled playback, etc.). Thus, if the audio data includes the user speech "play country music, shuffled," speech processing service 122 can process the audio data to determine that the user wishes media client 108 to play country music tracks with the shuffle option turned on. Similarly, the audio data may include a command for playing a single media item (e.g., song track), collection of media items (e.g., a playlist, an album, etc.) or any other type of media item.

At operation 208, speech processing service 122 can request the content identifier for the media item identified in the audio data. For example, the user may have identified the media item by name, but media service 132 may use numerical identifiers to identify content (e.g., media item assets, tracks, playlists, albums, movies, etc.) managed by media service 132 that corresponds to the named media item. Speech processing service 122 can send the name of the media item (e.g., media item identifier) identified in the audio data to media service 132 so that media service 132 can perform a search for content relevant to the identified media item.

At operation 210, media service 132 can send the content identifier for the identified media item to speech processing service 122. For example, after performing a search for content relevant to the identified media item, media service 132 may have found an identifier for the media item named by the user in the spoken command. If an identifier was found, media service 132 can send the content identifier to speech processing service 122. Speech processing service 122 can then send the content identifier to speech processing client 104 at operation 212.

At operation 214, speech processing client 104 can provide media client 108 the content identifier received from speech processing service 122. For example, if media client 108 has not already been invoked on user device 102, speech processing client 104 can invoke media client 108 and send the content identifier received from speech processing service 122 to media client 108. Operation 214 can be a request for media client 108 to play the content identified by content identifier, for example.

At operation 222, media client 108 can request a lease for presenting media items served by media service 132. For example, as a condition of the user's subscription to media service 132, the user may be restricted in the number of user devices that can simultaneously receive or playback media items from media service 132. The user's subscription may provide access to only one user device at a time. The user's subscription may provide access to a maximum number (e.g., 3, 6, 10, etc.) of devices at a time. To control the number of devices that can access media service a user's subscription account may be allocated a number (e.g., 3, 6, 10, etc.) of leases for accessing media service 132. When a user device (e.g., user device 102) accesses media service 132, the user device can request a lease. If the maximum number of leases have already been allocated to other user devices, media service 132 will cancel one of the leases allocated to another device and allocate the lease to the requesting user device. In response to receiving the request for a lease from media client 108 at operation 222, media service 132 can allocate a lease to user device 102 at operation 224. In some implementations, media service 132 can send the user's account encryption keys to media client 108 at operation 224.

Operations 222 and 224 can comprise communication roundtrip 220 between user device 102 and media service 132. For example, each communication roundtrip between user device and media service 132 can increase the amount of time delay between the user's spoken command (e.g., request for a media item) and the initiation of playback of the media item. Contrariwise, reducing the number of roundtrips between user device 102 and media service 132 can increase the perceived responsiveness of user device 102 to user commands and improve the user's enjoyment of user device 102.

At operation 232, media client 108 can request content information for the content identified by media service 132. For example, media client 108 can send the content identifier received at operation 214 to media service 132 in a request for additional information about the identified content. When the content identifier corresponds to a media item playlist, album, media station, or other collection of media items, then media service 132 can determine and return the individual media item identifiers (e.g., track identifiers) for each media item in the identified media item collection to media client 108 at operation 234. Operations 232 and 234 can correspond to communication roundtrip 230. When the content identifier corresponds to a single media item (e.g., a single song was requested by the user), then media service can return the asset information for the single media item at operation 244, described below.

At operation 242, media client 108 can request asset information for an individual media item. For example, when processing a media item collection, media client 108 can iterate through (e.g., loop through) the list of individual media item identifiers and request asset information for each individual media item. For example, while one media item is being played by media client 108, media client 108 can request asset information for the next media item in the collection. Thus, media client 108 can request asset information as needed, rather than requesting all asset information. Media client 108 can send the identifier for the individual media item in the request for the asset information corresponding to the individual media item. In response to receiving the request, media service 132 can obtain the asset information corresponding to the individual media item identifier. The asset information can include an asset uniform resource locator (URL), an asset decryption key, and/or asset metadata (e.g., information describing title, artist, genre, length of the asset, etc.). At operation 244, media service 132 can return the asset information to media client 108. Operations 242 and 244 can correspond to communication roundtrip 240.

At operation 252, media client 108 can request the asset corresponding to a media item. For example, in response to receiving the asset information at operation 244, media client 108 can use the URL in the asset information to request the asset (e.g., bytes of data comprising the content of the media item) from media service 132. Media service 124 can obtain the asset corresponding to the URL and send the encrypted asset to media client 108. Media client 108 can then decrypt the encrypted asset using the asset decryption key received at operation 244 and present the decrypted media asset to the user. In some implementations, the asset decryption key may be encrypted using a user account key. Media client 108 can decrypt the asset decryption key using the user account keys received at operation 224 described above. If there are more media items to obtain from media service 132 (e.g., more media items in the media item collection to obtain), then media client 108 can return to operation 242 to request the asset information for the next media item in the collection.

While the above process interaction flow diagram 200 illustrates mechanisms for obtaining media items (e.g., media assets) in response to a spoken command, the operations performed above and the multiple roundtrip communications may create delays between receiving the spoken command and initiating playback of the first media item. The operations described with respect to process flow diagram 300 below reduce the number of roundtrip communications required to initiate playback of the first media item in response to a spoken command.

Figure 3:
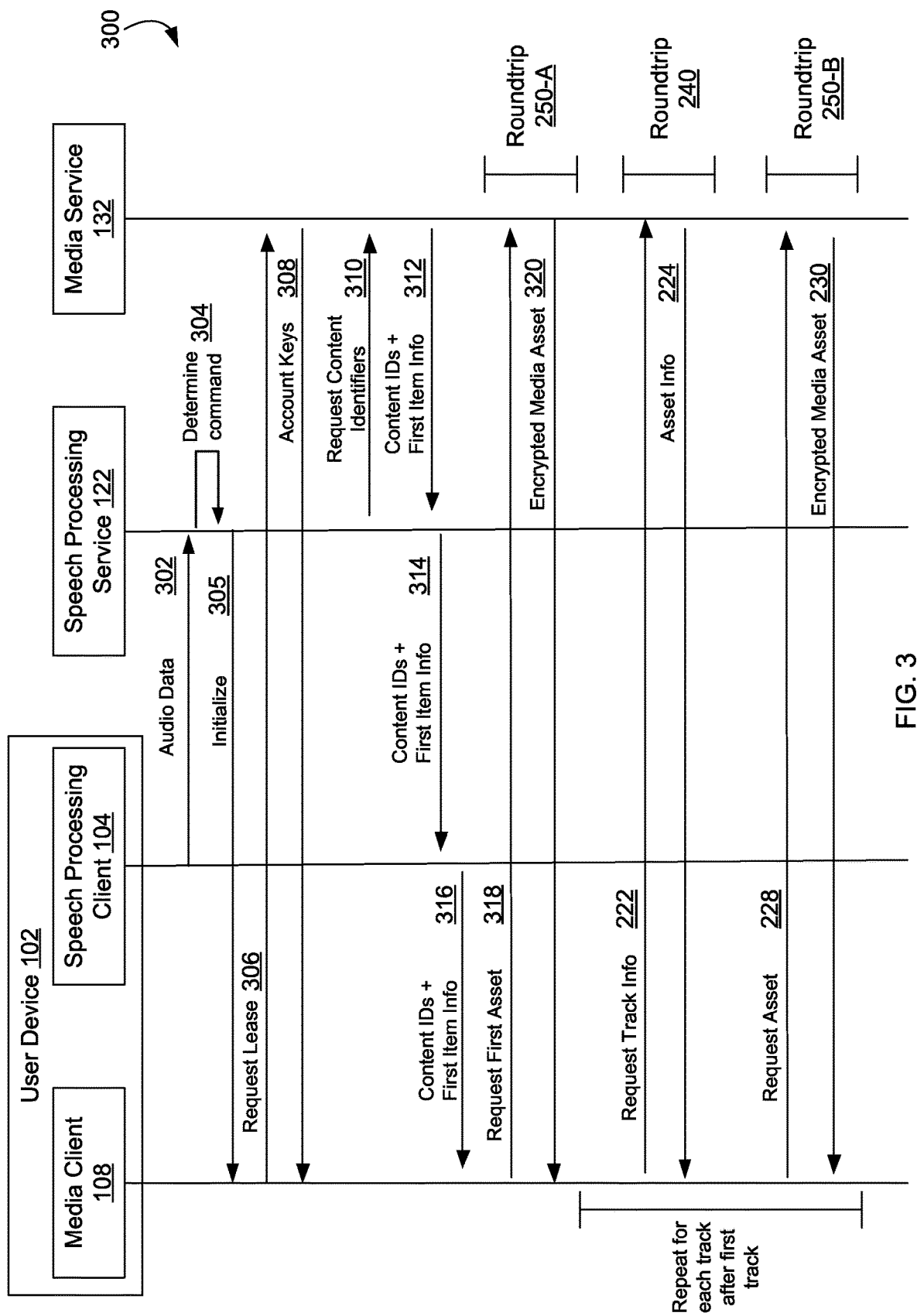
FIG. 3 is a process interaction flow diagram illustrating operations performed by the system to reduce startup delays when processing a spoken command to obtain a first media item from a network media service.

FIG. 3 is a process interaction flow diagram 300 illustrating operations performed by system 100 to reduce startup delays when processing a spoken command to obtain a first media item from a network media service. For example, to reduce the amount of delay between the user's spoken command and the playback of the first media item, system 100 can perform the lease request operations when speech processing service 122 is processing the audio data corresponding to the spoken command thereby removing a communication roundtrip between media client 108 and media service 132. Additionally, media service 132 can deliver the individual media item identifiers for a media item collection and first media asset information along with the content identifiers corresponding to the media item identified in the spoken command to further reduce the number of communication roundtrips required to initiate playback of the first media item.

At operation 302, speech processing client 104 can send audio data corresponding to a spoken command to speech processing service 122. For example, when a user invokes speech processing client 104 on user device 102, speech processing client 104 can receive audio data corresponding to the user's spoken command from microphone 106 of user device 102, as described above. In response to receiving the audio data from microphone 106, speech processing client 104 can send the audio data corresponding to the user's speech and an identifier for user device 102 to speech processing service 122.

At operation 304, speech processing service 122 can process the audio data to determine the command spoken by the user. For example, in response to receiving the audio data, speech processing service 122 can process the audio data to determine the command spoken by the user. For example, the command can identify an operation to be performed by media client 108 (e.g., play a media item). The command can identify a media item upon which the operation is to be performed (e.g., a name for a media item, genre, playlist, album, movie, etc.). The command can indicate an option for performing the operation (e.g., repeated playback, shuffled playback, etc.). Thus, if the audio data includes the user speech "play country music, shuffled," speech processing service 122 can process the audio data to determine that the user wishes media client 108 to play country music tracks with the shuffle option turned on. Similarly, the audio data may include a command for playing a single media item (e.g., song track), collection of media items (e.g., a playlist, an album, etc.) or any other type of media item.

However, in some implementations, the speech processing client 104 may determine the command spoken by the user, including media item(s) and operation(s) and provide the identified media item(s) and operation(s) to the media service 132. In some implementations, speech processing client 104 and speech processing service 122 can share responsibility for determining media item(s) and operation(s).

At operation 305, speech processing service 122 can initialize media client 108. For example, speech processing service 122 can determine that the audio data includes a command to play music from media service 132 through media client 108. In response to this determination, speech processing service 122 can send a notification to user device 102 indicating that media client 108 should be initialized (e.g., invoked). In response to receiving the notification, user device 102 can initialize or invoke media client 108 on user device 102. In some implementations, the initialization of media client 108 (e.g., operations 306 and 308) can be done in parallel (e.g., simultaneously) with operations 310, 312, 314, and/or 316 described below. Thus, media client 108 will be ready to initiate playback of media items as soon as the relevant content identifiers and first item information are received at operation 316, described below.

At operation 306, media client 108 can request a lease for accessing media service 132. For example, as a condition of the user's subscription to media service 132, the user may be restricted in the number of user devices that can simultaneously receive or playback media items from media service 132. The user's subscription may provide access to only one user device at a time. The user's subscription may provide access to a maximum number (e.g., 3, 6, 10, etc.) of devices at a time. To control the number of devices that can access media service a user's subscription account may be allocated a number (e.g., 3, 6, 10, etc.) of leases for accessing media service 132. When a user device (e.g., user device 102) accesses media service 132, the user device can request a lease. If the maximum number of leases have already been allocated to other user devices, media service 132 will cancel one of the leases allocated to another device and allocate the lease to the requesting user device. In response to receiving the request for a lease from media client 108 at operation 306, media service 132 can allocate a lease to user device 102 (e.g., media client 108) and send the user's account encryption keys to media client 108 at operation 308.

At operation 310, speech processing service 122 can request the content identifier for the media item identified in the audio data. For example, the user may have identified the media item by name, but media service 132 may use numerical identifiers to identify content (e.g., media item assets, tracks, playlists, albums, movies, etc.) managed by media service 132 that corresponds to the named media item. Speech processing service 122 can send the name of the media item (e.g., media item identifier) identified in the audio data to media service 132 so that media service 132 can perform a search for content relevant to the identified media item.

At operation 312, media service 132 can send the content identifier for the identified media item to speech processing service 122. For example, after performing a search for content relevant to the identified media item, media service 132 may have found an identifier for the media item named by the user in the spoken command. If an identifier was found, media service 132 can send the content identifier to speech processing service 122. However, instead of just sending a content identifier at operation 312, as described above with respect to operation 210 of diagram 200, media service 132 can send the content identifier for the playlist, album, station, or other media item collection and send the individual media item identifiers for each media item in the media item collection at operation 312. Moreover, media service 132 can include asset information for the first media item in the collection, a first random media item, and/or a first non-explicit media item at operation 312, as illustrated by the data structures of FIG. 4. By sending the asset information for the first media item (e.g., first media item, first random media item, or first non-explicit media item) at operation 312, system 100 can avoid performing communication roundtrips 230 and 240 of FIG. 2 for the first media item. By avoiding roundtrips 230 and 240, system 100 can reduce the time delay between receiving the user's spoken command and initiating playback of the first media item. Accordingly, roundtrip 250-A will commence without use of roundtrips 230 and 240.

Figure 4:
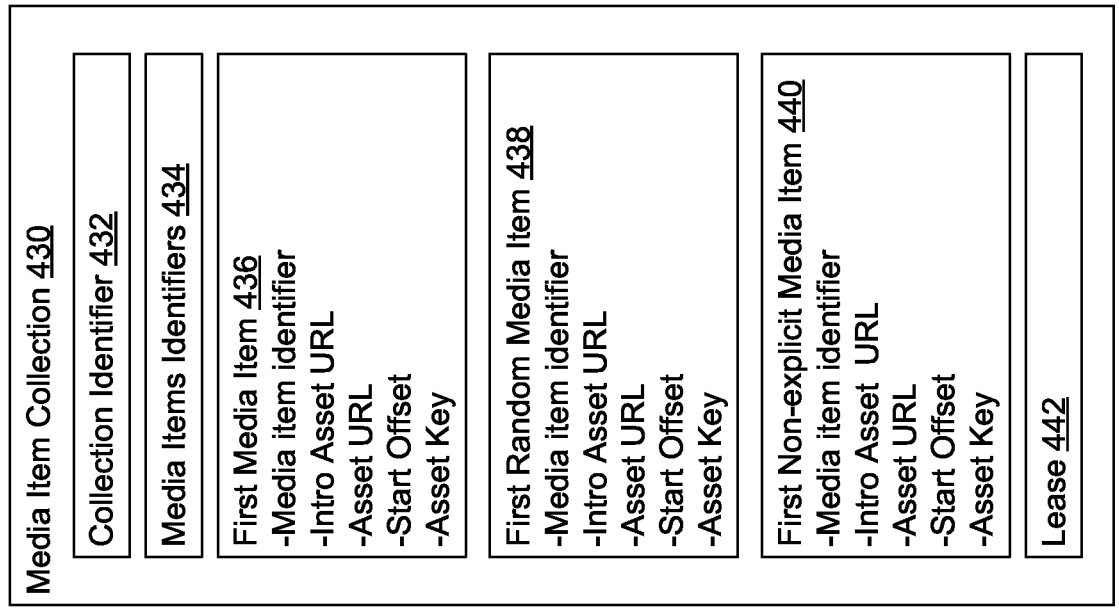
FIG. 4 illustrates example data structures for sending first media item information to a media client.
Figure 4:
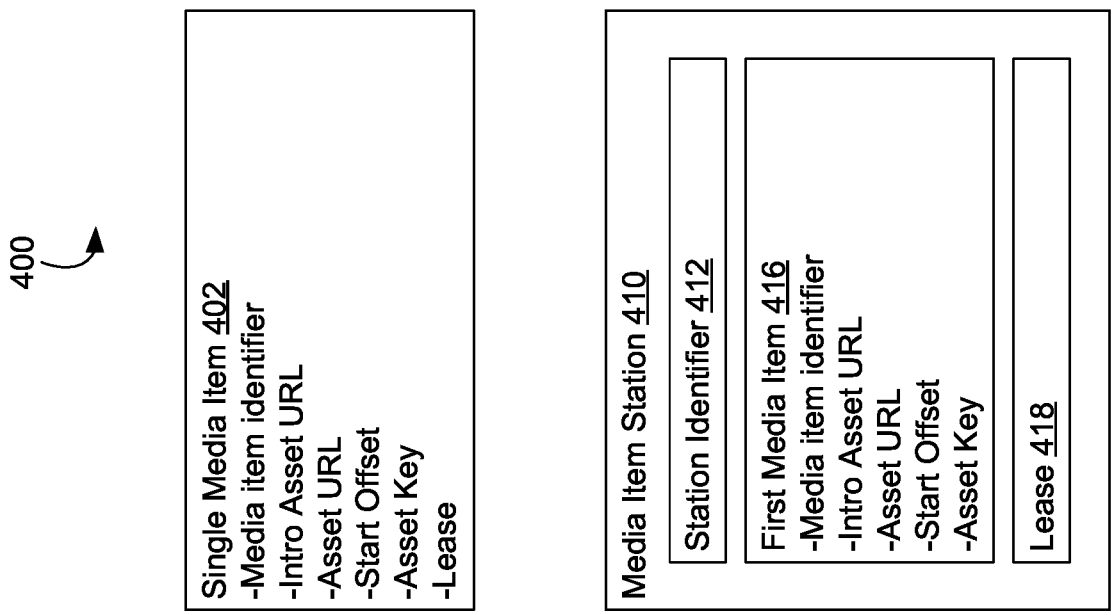

FIG. 4 illustrates example data structures 400 for sending first media item information to media client 108. For example, system 100 can reduce the number of communication roundtrips between media client 108 and media service 132 by providing information necessary for media client 108 to obtain the first media item to be played in the response to the content identifier request in operation 312.

In some implementations, media service 132 can send single media item data 402 to a user device. For example, when the media item requested by the user in the spoken command is a single media item (e.g., as opposed to a playlist, station, or other collection of media items), media service 132 can generate single media item data 402 for the media item identified in the content identifier request of operation 310. The attributes of single media item data 402 can include the media item identifier (e.g., may be the same as the content identifier) for the single media item, an introductory asset URL (described further below), the asset URL for obtaining the asset corresponding to the media item, a start offset (described further below), an asset key for decrypting the asset, and/or a lease identifier.

In some implementations, media service 132 can send media item station data 410. For example, the content identifier request of operation 312 can name a media station (e.g., radio station, television station, genre-specific radio station, etc.). In response to receiving the content identifier request at operation 312, media service 132 can generate media item station data 410 for the named media station. Media item station data 410 can include, for example, station identifier 412 for the requested media item station and lease identifier 418.

In some implementations, media item station data 410 can include first media item data 416. For example, first media item data 416 can provide information necessary for media client 108 to obtain the asset data necessary to initiate playback of the first media item associated with the requested media item station. For example, first media item data 416 can include a media item identifier (e.g., track identifier, movie identifier, etc.), an introductory asset URL, an asset URL, a start offset, and/or an asset key for decrypting the media item asset.

In some implementations, media service 132 can send media item collection data 430. For example, the content identifier request of operation 312 can name a media item collection (e.g., album, playlist, etc.). In response to receiving the content identifier request at operation 312, media service 132 can generate media item station data 410 for the named content item collection. Media item station data 410 can include, for example, collection identifier 432 for the requested media item collection, an array of media item identifiers 434, and/or lease identifier 418.

In some implementations, media item collection data 430 can include first media item data 436. For example, first media item data 436 can provide information necessary for media client 108 to obtain the asset data necessary to initiate playback of the first media item associated with the requested media item collection. For example, first media item data 436 can include a media item identifier (e.g., track identifier, movie identifier, etc.), an introductory asset URL, an asset URL, a start offset, and/or an asset key for decrypting the media item asset referred to by the asset URL. When media client 108 is playing back media items in the corresponding media item collection according to the sequence defined by the collection, media client 108 will present the media item asset identified by first media item data 436 first.

In some implementations, media item collection data 430 can include first random media item data 438. For example, first random media item data 438 can provide information necessary for media client 108 to obtain the asset data necessary to initiate playback of the first random media item associated with the requested media item collection. For example, first random media item data 438 can include a media item identifier (e.g., track identifier, movie identifier, etc.), an introductory asset URL, an asset URL, a start offset, and/or an asset key for decrypting the media item asset referred to by the asset URL. When media client 108 is playing back media items in the corresponding media item collection in random order (e.g., shuffled), media client 108 will present the media item asset identified by first random media item data 438 first.

In some implementations, media item collection data 430 can include first non-explicit media item data 440. For example, first non-explicit media item data 440 can provide information necessary for media client 108 to obtain the asset data necessary to initiate playback of the first non-explicit media item associated with the requested media item collection. For example, first non-explicit media item data 440 can include a media item identifier (e.g., track identifier, movie identifier, etc.), an introductory asset URL, an asset URL, a start offset, and/or an asset key for decrypting the media item asset referred to by the asset URL. When media client 108 is playing back media items in the corresponding media item collection for a user who is below a parental control age threshold, media client 108 will present the media item asset identified by first non-explicit media item data 440 first.

Accordingly, media item collection data 430 can include one or more of first media item data 436, first random media item data 438, or first non-explicit media item data 440.

Referring back to FIG. 3, when speech processing service 122 receives the content identifiers and first item information from media service 132 at operation 312, speech processing service 122 can forward the content identifiers and first item information to speech processing client 104 at operation 314. Speech processing client 104 can then send the content identifiers and first item information to media client 108 at operation 316. For example, speech processing client 104 can invoke an application programming interface (API) of media client 108 to send the content identifiers and first item information to media client 108. Speech processing client 104 can store the content identifiers and first item information in memory shared with media client 108 so that media client 108 can obtain the content identifiers and first item information from the shared memory location.

In response to accessing the content identifiers and first item information at operation 316, media client 108 can request the asset or assets corresponding to the first media item at operation 318. For example, when media client 108 accesses media item collection data 430 and media client 108 is configured for sequential playback of the media item collection, media client 108 can request the first media item using first media item data 436 (e.g., first sequential media item). When media client 108 receives media item collection data 430 and media client 108 is configured for random playback of the media item collection, media client 108 can request the first media item using first random media item data 438. When media client 108 receives media item collection data 430 and media client 108 is presenting media items to a user whose age is below some parental control threshold, media client 108 can request the first media item using first non-explicit media item data 440.

In some implementations, the first media item can include an introductory asset. For example, when the first item information received at operation 316 includes an introductory asset URL, media client 108 can request the introductory asset using the introductory asset URL. For example, the introductory asset may be smaller in size than the full media item asset and, therefore, may be downloaded and decrypted more quickly than the full media asset. Moreover, the size of the introductory asset may be reduced further, thereby reducing the delay between user command and playback, by providing an introductory media asset that is of a lower quality than the full media asset. For example, the full media asset can be a high definition media asset while the introductory media asset can be a lower definition media asset. Further, the introductory asset may be lightly encrypted (e.g., using a universal key encoded on all user devices) or not encrypted at all. Thus, media client 108 may be able to begin playback of the introductory asset much more quickly than the full media asset. After the full media asset is downloaded and decrypted, media client 108 can transition from playing the introductory asset to playing the full media asset, as described further below. When the first item information does not include an introductory asset URL, media client 108 can request the full asset using the asset URL.

At operation 320, media service 132 can send the encrypted media asset corresponding to the asset URL to media client 108. For example, media service 132 can send the data bytes for the media asset associated with the introductory asset URL and/or the full asset URL to media client 108. In some implementations, the data bytes for the media asset and/or introductory media asset can be encrypted.

In response to receiving the introductory media asset, media client 108 can decrypt the introductory media asset, if encrypted, and initiate playback of the introductory media asset. Because the introductory media asset is smaller than the full media asset and is either lightly encrypted (e.g., using a global key) or not encrypted, media client 108 can begin playback of the introductory media asset more quickly than the full media asset. Moreover, media client 108 can download and decrypt the full media asset while the introductory media asset is playing, thus the user can start enjoying the requested media item before the full media asset is available for playback by media client 108.

In some implementations, the full media asset associated with the first asset URL can be decrypted using the asset key received at operation 316. For example, the first item information received at operation 316 can include an asset key for decrypting the encrypted media asset associated with the first asset URL. The asset key can be encrypted using a user account key associated with the user's subscription account with media service 132. Media client 108 can use the user account key to decrypt the asset key and, in turn, use the asset key to decrypt the media asset received by media client 108 at operation 320. After decrypting the media asset, media client 108 can begin playback of the decrypted media asset. For example, if media client 108 has already begun playback of an introductory media asset, media client 108 can transition from playback of the introductory media asset to playback of the full media asset, as described below with reference to FIG. 5.

Figure 5:
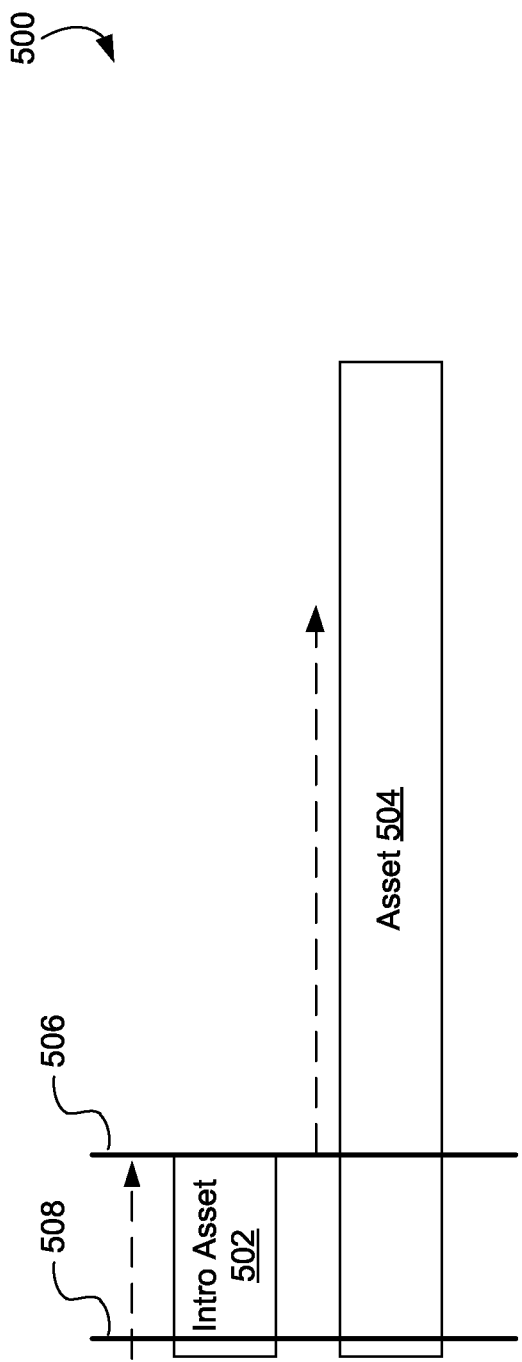
FIG. 5 is a diagram illustrating the transition from playback of an introductory media asset to playback of a full media asset.

FIG. 5 is a diagram 500 illustrating the transition from playback of an introductory media asset to playback of a full media asset. For example, diagram 500 includes an introductory media asset 502 and a full media asset 504. Introductory media asset 502 can correspond to a beginning portion (e.g., first 5 seconds, first 12 seconds, etc.) of full media asset 504. Media client 108 can download, decrypt (if needed), and begin playback of introductory media asset 502 before full media asset 504 is downloaded by media client 108.

In some implementations, media client 108 can download and encrypt full media asset 504 (or a portion thereof) while media client 108 plays introductory asset 502. After downloading and decrypting full media asset 504, media client 108 can transition from playing introductory media asset 502 to playing full media asset 504. For example, when media client 108 reaches the end of introductory media asset 502 (or sometime before the end), media client 108 can transition to playing full media asset 504. Line 506 represents a transition time for transitioning from playing introductory asset 502 to playing full media asset 504. For example, if introductory asset 502 is 10 seconds long, line 506 can correspond to 9 seconds (or 6 seconds, or 5 seconds, etc.) into the playback of introductory asset 502. Since introductory asset 502 corresponds to a beginning portion of full media asset 504, media client 108 can stop playing introductory media asset 502 at the 9 second mark and begin playback of full media asset 504 at the 9 second mark. Media client 108 can then playback the full media asset 504 until completion or until the user provides input to stop playback of full media asset 504. For example, media client 108 can be configured to play back two tracks simultaneously. The first track can include introductory media asset 502 and can be started before downloading and playing full media asset 504. The second track can include full media asset 504. For example, full media asset 504 can be loaded into the second track after the first track (introductory media asset 502) has started playing. However, media asset 502 can synchronize the first and the second tracks so that they are playing from the same time location (e.g., time offset) in each track. Thus, if media client 108 is 6 seconds into introductory media asset 502 when full media asset 504 is loaded into the second track, media client 108 can start playing full media asset 504 at 6 seconds (e.g., time offset) from the beginning of full media asset 504. Media client 108 can then play both introductory asset 502 and full asset 504 simultaneously for a few seconds and then mute the first track to transition from playing introductory media asset 502 to playing full media asset 504.

In some implementations, a media item can include an amount of silence at the beginning of playback of the corresponding media asset. This silence, while part of the media asset, may cause the user to perceive a delay in playback. This delay may cause the user to feel like user device 102, media client 108, and/or media service 132 is not very responsive. To reduce this perceived delay and to improve the user experience, a media asset may be configured with a start offset, as described above with reference to FIG. 4.

In some implementations, media service 132 can analyze the audio signal corresponding to media asset 504 to determine an amount of silence at the beginning of media asset 504. Media service 132 can determine, for example, that media asset 504 includes 3 seconds of silence at the beginning of media asset 504. Media service 132 can configure the start offset attribute of the first media item data (described with reference to FIG. 4) to indicate a 3 second start offset. When media client 108 begins playback of introductory asset 502 and/or full media asset 504, media client 108 can begin playback starting at the start offset, as indicated by line 508. For example, media client 108 plays back introductory asset 502, media client 108 can begin playback 3 seconds in from the beginning of introductory asset 502. If not introductory media asset is available for the first media item, then media client 108 can begin playback of full media asset 504 3 seconds from the beginning of full media asset 504.

Referring back to FIG. 3, after initiating playback of the first media item, system 100 can perform operations 222, 224, 228, and 230 as described above to obtain and playback subsequent media items. Operations 222, 224, 228, and 230 can be repeated for each subsequent media item to be played back by media client 108.

In some implementations, system 100 can reduce the perceived delay between receiving a user's spoken command and initiating playback of the first media item by reducing the number of communication roundtrips between user device 102 can media service 132. However, system 100 can be configured to perform other operations to reduce the perceived delay between receiving the user's command and initiating playback of the first media item.

In some implementations, speech processing client 104 can be configured to fill the silence before the first media item is played. For example, if user device 102 detects a slow network connection between user device 102 and media service 132, speech processing client 104 can present informational audio related to the user's spoken command. For example, if the user requests that user device 102 play songs by Jimi Hendrix, speech processing client 104 can fill the silence before initiating playback of the first media item with history, trivia, etc., about Jimi Hendrix. If the user requests that user device 102 plays jazz music, speech processing client 104 can fill the silence before initiating playback of the first media item with some history, trivia, upcoming concert information, or other information related to the Jazz genre. To obtain this information, speech processing client 104 can initiate an Internet search for relevant information. The information can then be presented to the user using synthesized speech, for example.

In some implementations, system 100 can perform predictive caching of media items. For example, media client 108 and/or media service 132 may determine based on the user's historical habits that the user of user device 102 enjoys listing to the top music charts every week, or prefers to listen to country music, or enjoys listening to a particular talk radio show. Based on this determination, media client 108 and/or media service 132 can predict which media items the user is most likely to request, download the predicted media items to user device 102, and cache (e.g., store) the media items on user device 102. In some implementations, media client 108 can download and cache the full media asset for a media item. In some implementations media client 108 can download and cache the introductory media asset for the media item. Media service 132 can store information describing the media items cached on user device 102. When the user makes a media item request (e.g., spoken command), as described above, media service 132 can select the first media item from the media items cached on user device 102 and media client 108 can playback the introductory asset or full media asset for the first media item from the cached media items on user device 102. Thus, because media client 108 does not have to download the first media item from media service 132, operations 318 and 320 (e.g., roundtrip 250-A) of FIG. 3 can be skipped for the first media item and media client 108 can begin playback of the first media item with less delay between receiving the spoken command from the user and initiating playback of the first media item.

In some implementations, system 100 can include the data bytes for the introductory asset associated with the first media item in the first item information. For example, instead of including an introductory asset URL in the first item information at operation 312, media service 132 can include the actual asset data (e.g., at least video or audio data bytes) for the introductory asset for the first media item in the first item information at operation 312. Thus, when media client 108 receives the content identifiers and first item information at operation 316, media client 108 can immediately begin playback of the introductory media asset bytes. Thus, the amount of delay between receiving the user's spoken command and initiating playback of the first media item can be reduced because a subsequent request to media service 132 to obtain the introductory media asset data is not required.

Figure 6:
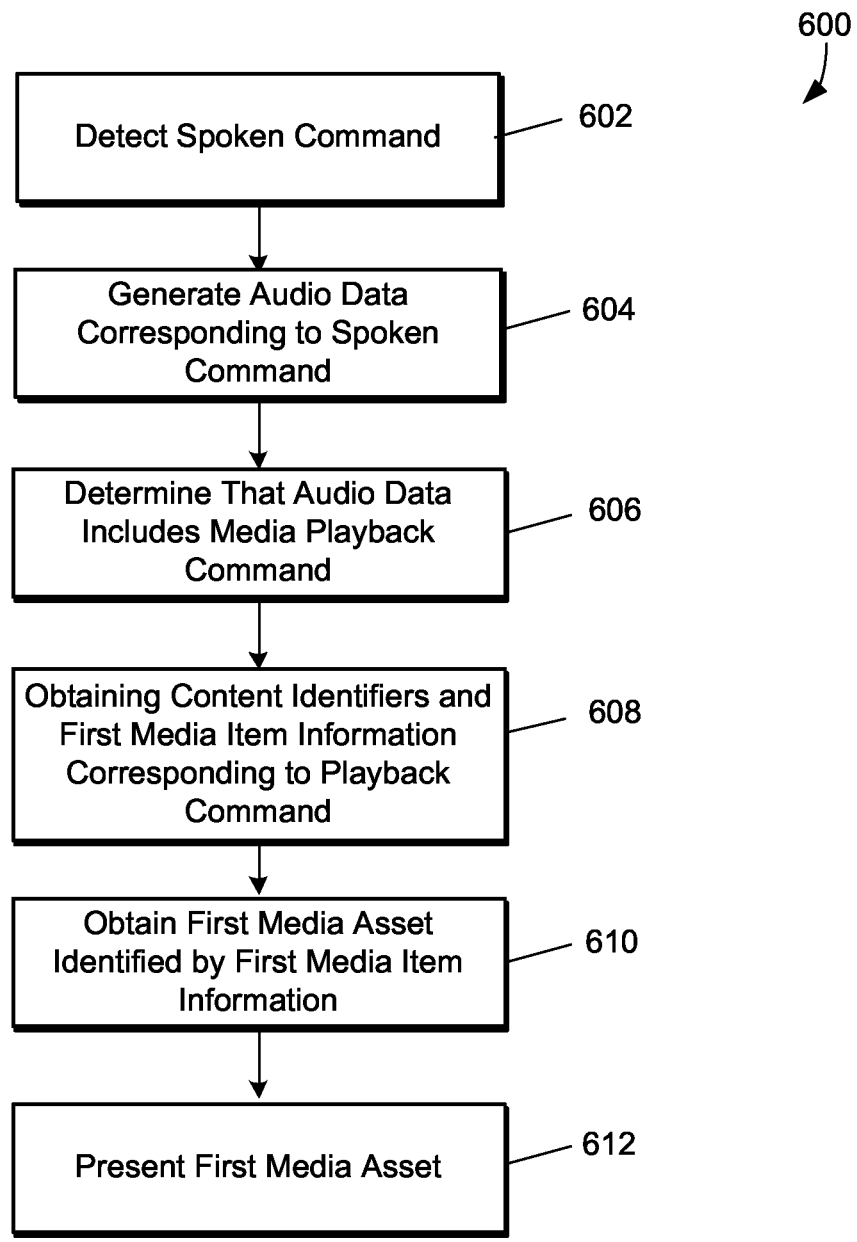
FIG. 6 is a flow diagram of an example process for reducing startup delays for presenting remote media items.

FIG. 6 is a flow diagram of an example process 600 for reducing startup delays for presenting remote media items. For example, process 600 can be performed by user device 102 in cooperation with speech processing server 120 and/or media server 130 to reduce the amount of time between receiving a user's spoken command that includes a media playback command and initiating playback of a media item.

At step 602, user device 102 can detect a spoken command. For example, user device 102 can be configured with microphone 106 for detecting sound (e.g. speech, ambient sound, etc.) near user device 102.

At step 604, user device 102 can generate audio data corresponding to the spoken command. When the user provide input (a spoken word, a button press, etc.) indicating that the user will provide a spoken command, speech processing client 104 can begin recording audio data generated by microphone 106. For example, the user of user device 102 can speak a command that can be detected by microphone 106 and/or speech processing client 104. The audio data corresponding to spoken command can be recorded by speech processing client 104.

At step 606, user device 102 can determine that the audio data includes a media playback command. For example, speech processing client 104 can send the audio data to speech processing service 122 to have the spoken command in the audio data processed. Speech processing service 122 can determine that the audio data includes a spoken command to play a media item. Alternatively, speech processing client 104 can process the audio data to determine the spoken command. Speech processing service 122 and/or speech processing client 104 can determine that the spoken playback command identifies content (e.g., a specific media item, playlist, genre, album, etc.) that the user would like user device 102 to play.

At step 608, user device 102 can obtain content identifiers and first media item information corresponding to the playback command. For example, after processing the audio data and determining the content identified by the user's spoken playback command, speech processing service 122 can obtain content identifiers and first media item information corresponding to the identified content from media service 132. Alternatively, when speech processing client 104 determines the playback command spoken by the user, speech processing client 104 on user device 102 can obtain the content identifiers and first media item information corresponding to the identified content from media service 132.

At step 610, user device 102 can obtain the first media asset identified in the first media item information. For example, the first media item information can identify a first sequential media item to present during sequential playback of a collection of media items. The first media item information can identify a first random media item to present during sequential playback of a collection of media items. The first media item information can identify a first non-explicit media item to present when parental controls are enabled during playback of a collection of media items. The first media item information can identify an introductory media asset. The first media item information can identify a full media asset. When the first media item information includes an introductory media asset, media client 108 can obtain the introductory media asset from media service 132 before obtaining the full media asset from media service 132. In some implementations, media client 108 can obtain the first media asset (e.g., introductory media asset, full media asset, etc.) from local storage on user device 102 when the first media asset has been previously cached on user device 102, as described above.

At step 162, user device 102 can present the first media asset. For example, after obtaining the first media asset, media client 108 can present the first media asset on user device 102.

To enable the reader to obtain a clear understanding of the technological concepts described herein, the above processes and/or operations describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes and/or operations above may omit or briefly summarize some of the details of the technologies disclosed herein for clarity, the details described in the paragraphs above may be combined to get a more complete and comprehensive understanding of these processes and the technologies disclosed herein.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 7:
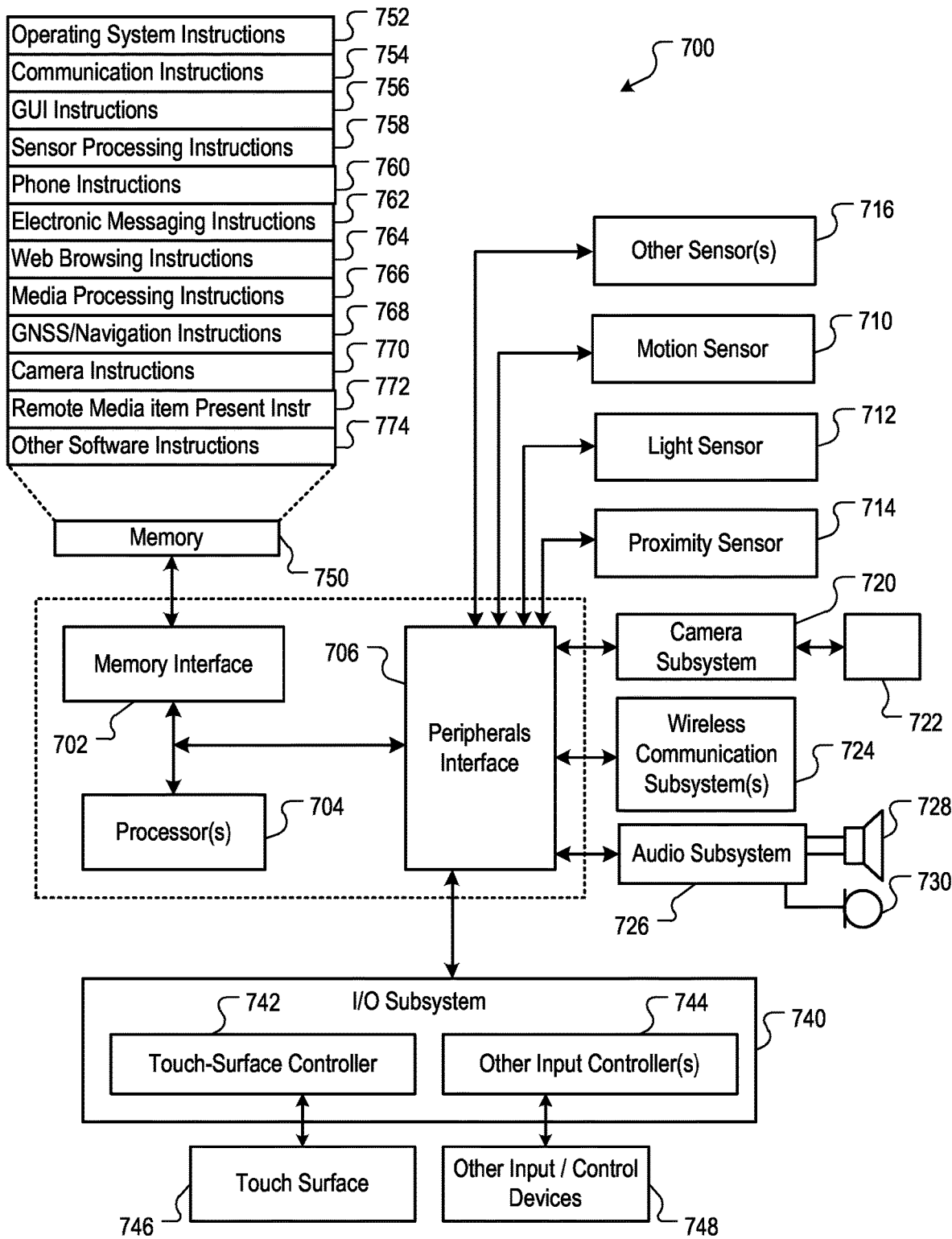
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the computing device 700 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the remote media item presentation features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the remote media item presentation processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

What is claimed is:

1. A non-transitory computer-readable medium comprising instructions that, when executed by one or more processors of a computing device, cause the one or more processors to perform operations comprising:
   detecting, by the computing device, a command spoken by a user of the computing device;
   generating, by the computing device, audio data corresponding to the spoken command;
   forwarding, by the computing device, the audio data for processing;
   receiving, from a network media service and in response to forwarding the audio data, a media asset corresponding to a first media item identified based upon the spoken command;
   obtaining, by the computing device, before or while receiving the media asset, information related to the spoken command;
   mitigating a perception of an initial startup delay caused by establishing a connection to a network media service by presenting, by the computing device, before or while receiving the media asset and during a period of silence between detecting the spoken command and providing an audio output in response to the spoken command, informational audio indicative of the information related to the spoken command; and
   presenting, by the computing device, the media asset after presenting the informational audio.

2. The non-transitory computer-readable medium of claim 1, wherein the operations further comprise:
   detecting, by the computing device, a slow network connection between the computing device and the network media service; and
   presenting the informational audio in response to detecting the slow network connection.

3. The non-transitory computer-readable medium of claim 1, wherein mitigating the perception of the initial startup delay comprises reducing a duration of the period of silence by presenting the informational audio prior to presenting the media asset.

4. The non-transitory computer-readable medium of claim 1, wherein the informational audio comprises information about an artist included in the spoken command.

5. The non-transitory computer-readable medium of claim 1, wherein the informational audio comprises information about a genre of music included in the spoken command.

6. The non-transitory computer-readable medium of claim 1, wherein the operations comprise performing, by the computing device, an Internet search for information associated with the first media item to be used as the information related to the spoken command, wherein the informational audio indicates the information associated with the first media item obtained via the Internet search.

7. The non-transitory computer-readable medium of claim 1, wherein the informational audio comprises information about a song included in the spoken command, wherein the media asset is the song.

8. The non-transitory computer-readable medium of claim 1, wherein the media asset is an introductory media asset that corresponds to a first portion of the first media item associated with a first runtime, wherein the first runtime is less than an entire runtime of the first media item.

9. The non-transitory computer-readable medium of claim 8, wherein the operations comprise:
   downloading, by the computing device, a full media asset of the first media item while presenting the introductory media asset, wherein the full media asset is separate from the introductory media asset and corresponds to a second portion of the first media item that is associated with a second runtime and comprises at least a portion of the first portion of the first media item; and
   transitioning from presenting the introductory media asset to presenting the full media asset after presenting the introductory media asset.

10. A method comprising:
    detecting, by a computing device, a command spoken by a user of the computing device;
    generating, by the computing device, audio data corresponding to the spoken command;
    forwarding, by the computing device, the audio data for processing;
    receiving, from a network media service and in response to forwarding the audio data, a media asset of a first media item identified based upon the spoken command;
    obtaining, by the computing device, before or while receiving the media asset, information related to the spoken command;
    mitigating a perception of an initial startup delay caused by establishing a connection to a network media service by presenting, by the computing device, before or while receiving the media asset and during a period of silence between detecting the spoken command and providing an audio output in response to the spoken command, informational audio indicative of the information related to the spoken command; and
    presenting, by the computing device, the media asset after presenting the informational audio.

11. The method of claim 10, comprising performing, by the computing device, an Internet search for information associated with the first media item to be used as the information related to the spoken command, wherein the informational audio indicates the information associated with the first media item obtained via the Internet search.

12. The method of claim 11, wherein presenting the informational audio comprises using synthesized speech to present the information associated with the first media item obtained via the Internet search.

13. The method of claim 12, wherein the informational audio comprises information about an artist included in the spoken command or a genre of music included in the spoken command.

14. The method of claim 12, comprising:
detecting, by the computing device, a slow network connection between the computing device and the network media service; and
presenting the informational audio in response to detecting the slow network connection.

15. An electronic device comprising:
a speaker;
a microphone; and
one or more processors, configured to:
detect, via the microphone, a spoken command;
generate audio data corresponding to the spoken command;
forward the audio data for processing;
receive, from a network media service and in response to forwarding the audio data, a media asset of a first media item identified based upon the spoken command;
obtain, before or while receiving the media asset, information related to the spoken command;
mitigate a perception of an initial startup delay caused by establishing a connection to a network media service by presenting, before or while receiving the media asset and during a period of silence between detecting the spoken command and providing an audio output in response to the spoken command, informational audio indicative of the information related to the spoken command; and
present, the media asset after presenting the informational audio.

16. The electronic device of claim 15, wherein:
the media asset is an introductory media asset that corresponds to a first portion of the first media item associated with a first runtime that is less than an entire runtime of the first media item; and
the one or more processors are further configured to:
cause, by the electronic device, a full media asset of the first media item to be downloaded while presenting the introductory media asset, wherein the full media asset is separate from the introductory media asset and corresponds to a second portion of the first media item that is associated with a second runtime and comprises at least a portion of the first portion of the first media item; and
cause the electronic device to transition from presenting the introductory media asset to presenting the full media asset after presenting the introductory media asset.

17. The electronic device of claim 16, wherein transitioning from presenting the introductory media asset to presenting the full media asset comprises simultaneously presenting the full media asset and the introductory media asset.

18. The electronic device of claim 15, wherein
presentation of the informational audio occurs prior to presentation of any media assets.

19. The electronic device of claim 15, wherein the one or more processors are further configured to cause performance of a search for information about a music artist, content title, or a genre of music included in the spoken command to be used as the information related to the spoken command, wherein the informational audio indicates history, trivia, upcoming concert information, or any combination thereof obtained via the search.

20. The electronic device of claim 15, wherein the electronic device comprises a computer, a smartphone, a smart speaker, or a wearable computing device.

* * * * *